United States Patent Office 3,377,135
Patented Apr. 9, 1968

3,377,135
DEUTERIUM CONCENTRATION PROCESSES
Albert Raymond Kenyon, Didcot, England, assignor to United Kingdom Atomic Energy Authority, London, England
No Drawing. Filed Feb. 6, 1961, Ser. No. 87,490
Claims priority, application Great Britain, Feb. 4, 1960, 4,087/60
3 Claims. (Cl. 23—193)

This invention relates to deuterium concentration processes.

One particularly valuable process for deuterium concentration is the hydrogen isotope exchange reaction between gaseous hydrogen and liquid ammonia, in which deuterium is concentrated in the ammonia phase at the expense of the hydrogen phase. This reaction has been observed to occur at an appreciable rate at temperature as low as −60° C. in the presence of an ionic catalyst such as potassamide dissolved in the liquid ammonia.

The rate of exchange, however, has still been found to be very slow, which makes the achievement of equilibrium at any particular temperature a difficult problem, particularly where continuous counter-current contacting equipment is used, such as would be necessary for the production of deuterium-enriched material on a large scale.

It has now been discovered that the rate of exchange of hydrogen isotopes between gaseous hydrogen and liquid ammonia, in the presence of an ionic catalyst such as potassamide, is considerably enhanced by adding to the liquid ammonia a primary or secondary aliphatic amine, such as methylamine, dimethylamine, or diethylamine. An even greater enhancement of the exchange rate is achieved if the amine is a fully-hydrogenated cyclic secondary amine, such as pyrrolidine, piperidine, or homologues thereof such as 2-methyl pyrrolidine. The preferred amine is pyrrolidine.

Thus, according to the present invention, a process of deuterium concentration comprises contacting gaseous hydrogen with a liquid mixture of ammonia and a primary or secondary aliphatic amine, the mixture having dissolved therein an ionic catalyst for the hydrogen isotope exchange reaction between liquid ammonia and gaseous hydrogen.

Preferably the amine is a fully-hydrogenated cyclic secondary amine, preferably pyrrolidine.

It is essential that the amine which is added to the liquid ammonia should be free from oxidising impurities, such as water and oxygen, which would attack and decompose the catalyst.

The following examples illustrate the process of the invention:

Example I

To 100 ml. liquid ammonia, containing 1.82 g. potassamide, was added 100 ml. dimethylamine. Hydrogen gas was then bubbled once through the mixture in a vertical column at −46° C., using a sintered glass disc to distribute the gas at the bottom of the column. The amount of deuterium transferred from the hyedrogen to the ammonia was determined by mass-spectographic analysis and was found to be 40% of the theoretical amount which would have been transferred if equilibrium had been reached. A similar experiment using the same apparatus, but using liquid ammonia without addition of dimethylamine, resulted in a deuterium transfer which was only 3% of the theoretical amount at equilibrium.

Thus, the process according to the invention achieved an increase in the rate of transfer of deuterium by a factor of about 13.

Example II

A similar experiment to Example I was carried out at −53° C. In this case the capacity coefficient of the process was evaluated, and found to be 4750 lb.-mols. hydrogen deuteride (HD) per hour, per unit concentration difference (lb.-mol. per cu. ft.) between the HD concentration in the liquid phase at the gas-liquid interface and the HD concentration in the bulk of the liquid, per cubic foot of column occupied by the liquid during the passage of gas through it. The corresponding figure for the capacity coefficient when liquid ammonia, without the addition of dimethylamine, was used was only 1200 lb.-mols per hour.

The following example illustrates the use of pyrrolidine as the amine.

Example III

To 210 ml. liquid ammonia, containing 7 g. potassamide, was added 40 ml. pyrrolidine (16% of the total volume). Hydrogen gas was then bubbled once through the mixture in a vertical column at −44° C., using a sintered glass disc to distribute the gas at the bottom of the column. The column was externally cooled to prevent boiling. The amount of deuterium transferred from the hydrogen to the ammonia was determined by mass spectrographic analysis and was found to be 23.6% of the theoretical amount which would have been transferred if equilibrium has been reached.

Similar experiments using the same apparatus, one using liquid ammonia without the addition of pyrrolidine and the other using liquid ammonia with 48% by volume dimethylamine added, resulted in deuterium transfers which were only 4.5% and 14% respectively of the theoretical amount at equilibrium.

It is thus apparent that the use of a fully-hydrogenated cyclic secondary amine, namely pyrrolidine, enabled a further increase in the rate of transfer of deuterium to be achieved, this rate being increased by a factor of about 5 using 16% pyrrolidine, as compared with only about 3 using 48% dimethylamine.

The process of the invention is of particular advantage when applied to a dual-temperature exchange system, in which a stream of liquid ammonia is passed successively through contacting apparatus at two different temperatures in which it is contacted with a counter-current stream of gaseous hydrogen, and both the ammonia and the hydrogen streams are recirculated. In such a system, because of the difference in the equilibrium exchange constant at different temperatures, deuterium is concentrated in both streams between one contacting apparatus and the other. Such a system avoids the need for chemically converting one stream to the other to achieve reflux.

I claim:
1. A process of deuterium concentration comprising contacting gaseous hydrogen with a liquid medium comprising ammonia and an amine selected from the group consisting of methylamine, dimethylamine, diethylamine, pyrrolidine and alkyl substituted derivatives thereof and piperidine and alkyl substituted derivatives thereof, said liquid medium having potassamide dissolved therein to act as a catalyst for the hydrogen isotope exchange reaction between liquid ammonia and gaseous hydrogen.

2. A process according to claim 1 wherein the amine is selected from the group consisting of methylamine, dimethylamine, pyrrolidine, 2-methyl pyrrolidine, and piperidine.

3. A process in accordance with claim 2 wherein the amine is pyrrolidine.

References Cited

UNITED STATES PATENTS 3,214,243 10/1965 Lazard et al. _____ 23—204 X
2,952,525 9/1960 Harteck _____ 23—204

FOREIGN PATENTS 559,765 10/1957 Belgium.

OTHER REFERENCES

Franklin: "Nitrogen System of Compounds," 1935, page 23.

OSCAR R. VERTIZ, *Primary Examiner.*

EDWARD STERN, MILTON WEISSMAN, MAURICE A. BRINDISI, *Examiners.*